United States Patent
Arai et al.

(10) Patent No.: US 7,894,931 B2
(45) Date of Patent: Feb. 22, 2011

(54) METHOD AND APPARATUS FOR PREDICTION OF AMOUNT OF DEFORMATION DUE TO SHRINKAGE OF MOLDED ARTICLE

(75) Inventors: Tsuyoshi Arai, Nagoya (JP); Tadayoshi Takahara, Toyota (JP); Yoshihito Saigo, Aichi-ken (JP); Tatsuya Inoyama, Susono (JP); Hiroshi Koyama, Tazimi (JP)

(73) Assignees: Denso Corporation, Kariya (JP); Toyota Jidosha Kabushiki Kaisha, Toyota (JP); Toyoda Gosei Co., Ltd., Nishikasugai (JP); Kanto Auto Works, Ltd, Yokosuka (JP); Toyota Boshoku Kabushiki Kaisha, Kariya (JP)

( * ) Notice: Subject to any disclaimer, the term of this patent is extended or adjusted under 35 U.S.C. 154(b) by 313 days.

(21) Appl. No.: 12/078,865

(22) Filed: Apr. 7, 2008

(65) Prior Publication Data

US 2008/0246188 A1 Oct. 9, 2008

(30) Foreign Application Priority Data

Apr. 9, 2007 (JP) .............................. 2007-101804

(51) Int. Cl.
*G06F 19/00* (2006.01)
*B29C 45/00* (2006.01)

(52) U.S. Cl. ................... 700/204; 700/197; 264/328.12

(58) Field of Classification Search .................. 700/97, 700/197, 200, 204; 264/40.1, 40.4, 40.7, 264/297.2, 328.12; 703/1, 2, 6; 425/145, 425/149

See application file for complete search history.

(56) References Cited

U.S. PATENT DOCUMENTS

| | | | | | |
|---|---|---|---|---|---|
| 5,811,133 | A | * | 9/1998 | Saito et al. | 425/145 |
| 6,136,235 | A | * | 10/2000 | Saito et al. | 264/40.1 |
| 6,304,794 | B1 | * | 10/2001 | Nishimine et al. | 700/197 |
| 6,704,693 | B1 | * | 3/2004 | Fan et al. | 703/1 |
| 7,497,916 | B2 | * | 3/2009 | Hayashi et al. | 264/40.1 |
| 2002/0128744 | A1 | * | 9/2002 | Nishiyama et al. | 700/200 |
| 2004/0210429 | A1 | * | 10/2004 | Yu et al. | 703/9 |
| 2004/0230411 | A1 | * | 11/2004 | Zheng et al. | 703/6 |

FOREIGN PATENT DOCUMENTS

| | | |
|---|---|---|
| JP | A-9-311114 | 12/1997 |
| JP | A-2004-009511 | 1/2004 |

OTHER PUBLICATIONS

Takahara et al. "The Development of High Accuracy Warpage Analysis CAE for Large, Thin Plastic Parts, Part 5—The Development of Practical Solver and Some Applications," *JSPP '06 Tech Papers*, pp. 269-270, 2006. (with Abstract).

Takahara et al, "The Development of High-Accuracy Warpage Analysis CAE for Large, Thin Plastic Parts," *SAE 2005 World Congress*, No. 2005-01-1070.

* cited by examiner

*Primary Examiner*—Charles R Kasenge
(74) *Attorney, Agent, or Firm*—Oliff & Berridge, PLC

(57) ABSTRACT

The method of predicting the amount of deformation due to shrinkage of a molded article of the present invention finds a support point P of the bending moment M from a distribution of shrinkage rates of a molding material forming a molded article 10 and uses the support point P to predict the amount of deformation. At that time, it is preferable to use the support point P to find the bending moment M and to use the bending moment M to predict the amount of deformation.

9 Claims, 10 Drawing Sheets

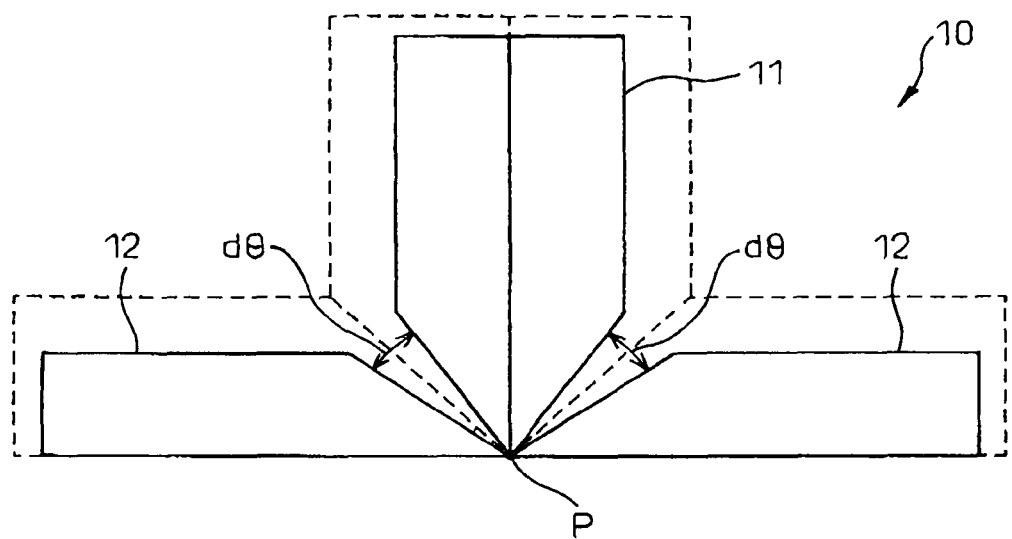

METHOD AND APPARATUS FOR PREDICTION OF AMOUNT OF DEFORMATION DUE TO SHRINKAGE OF MOLDED ARTICLE

The Applicant claims the right to priority based on Japanese Patent Application No. 2007-101804, filed on Apr. 9, 2007, the entire content of which being hereby incorporated by reference.

BACKGROUND OF THE INVENTION

1. Field of the Invention

The present invention relates to a method and apparatus for predicting the amount of deformation due to shrinkage of a molded article, more particularly relates to a method and apparatus for predicting the amount of deformation due to shrinkage of a molded article having a base on which a rib is provided.

2. Description of the Related Art

Plastic parts etc. formed by injection molding have long been extensively used. Improvement of the dimensional precision of plastic parts etc. is being sought in order to meet the demands for improvement of the dimensional precision of auto products etc. in which these plastic parts are being used.

Such an injection molded article in general shrinks and deforms when the molten state molding material solidifies. This deformation is mainly due to shrinkage in a direction perpendicular to the flow direction of the plastic or other molding material in the mold at the time of injection. Further, when the injection molded article is plate shaped, the deformation is due more to the shrinkage rate in the thickness direction than the shrinkage rate in the planar direction. That is, anisotropy of the shrinkage rate occurs. Further, an injection molded article is sometimes made to include talc, glass fiber, or another filler having anisotropy so as to improve the strength or add special functions. It is known that if such a filler having anisotropy is included, the anisotropy of the shrinkage rate further increases.

In plastic parts etc. formed by such injection molding, that shrinkage becomes a cause lowering the dimensional precision.

For example, Japanese Patent Publication (A) No. 2004-9511 and Japanese Patent Publication (A) No. 9-311114 disclose a method of predicting the amount of deformation of an injection molded article for feedback to the product design of the injection molded article etc. and improvement of the product quality and reduction of the development costs.

Japanese Patent Publication (A) No. 2004-9511 discloses a method of predicting warping deformation of a corner of a molded article due to the temperature change accompanying cooling at the time of injection molding which sets the shrinkage rate in the thickness direction of the corner to a value larger than the shrinkage rate in the surface direction so as to predict the warping direction of the corner.

Japanese Patent Publication (A) No. 2004-9511 discloses a method of predicting a slant angle dθ when an injection molded article 10 provided with a corner 16 having an original shape of a cross-section as shown in FIG. 1A (shape of mold cavity) freely deforms as shown in FIG. 1B due to shrinkage at the time of cooling after injection of the material into the mold. This dθ is the amount of reduction of the apex angle due to deformation of the corner. Expression by the following formula (1) is disclosed in Japanese Patent Publication (A) No. 2004-9511.

$$d\theta = (\pi - \alpha)\frac{(\varepsilon_p - \varepsilon_t)}{1 - \varepsilon_t} \quad (1)$$

Here, α indicates an apex angle of a corner before deformation, $\varepsilon_p$ indicates a shrinkage rate of an injection molded article 10 in the planar direction, and $\varepsilon_t$ indicates a shrinkage rate of an injection molded article 10 in the thickness direction.

FIG. 1B shows the state where the injection molded article 10 freely deforms. In FIG. 1B, the shape of the deformed injection molded article 10 is shown by the solid line, while the shape before deformation is shown by the broken line. In FIG. 1B, the corner 16 is drawn with a gap of dθ, but in actuality such a gap does not always occur. In the state of free deformation of the injection molded article 10, usually a state where the apex angle of the corner deforms to become α-dθ is obtained. Here, to clearly show the slant angle dθ, the drawing shown in FIG. 1B is used. In a later drawing for explaining the slant angle in the state of free deformation of the injection molded article, a similar drawing is used again.

Further, due to the rigidity of the injection molded article 10, the affixing of the corner 16, or other reasons, the injection molded article does not always freely deform as explained above. In this case, the corner 16 of the injection molded article 16, as shown in FIG. 1C, is acted on by a bending moment M due to shrinkage of the molding material and experiences internal stress trying to cause the corner 16 to deform.

This bending moment M can be found in the following way. If considering the geometric model shown in FIG. 1C from the state of free deformation shown in FIG. 1B, the relationship of dθ and the bending moment M is given by the following formula (2). This formula (2) can be derived by a known method if considering the free deformation of the corner 16 to be the case where a rectangular cross-section is bent to a cylindrical shape and considering that the radius of curvature of the cylinder is sufficiently large compared with the thickness H after shrinkage of the injection molded article 16 and the slant angle dθ is sufficiently small.

$$M = \frac{EH^3}{12(1-\nu^2)}\tan d\theta \frac{1}{L} \quad (2)$$

Here, E indicates a Young's modulus of the molding material, ν indicates a Poisson ratio of the molding material, and L is a length between the support point and the force point of the bending moment M, specifically the thickness after shrinkage. The support point P of the bending moment M becomes the apex of the corner 16.

Further, injection molded article 10, as shown in FIG. 2A, sometimes has a base 12 on which a rib 11 is provided. When such an injection molded article 10 freely deforms due to shrinkage, as shown in FIG. 2B, this rib 11 also deforms in the same way as the above-mentioned corner 16.

Therefore, to predict the amount of deformation of the injection molded article 10 such as shown in FIG. 2A, the amount of deformation of the rib 11 is predicted using the same technique as explained above while considering the support point P of the bending moment M to be the position shown in FIG. 2B. In FIG. 2B, the shape of the deformed injection molded article 10 is shown by the solid line, while the shape before deformation is shown by the broken line.

However, the predicted amount of deformation became a value larger than the actual amount of deformation of the rib 11. An accurate value could not be predicted. For that reason, there was the problem that in an injection molded article 10 having a base 12 on which a rib 11 was provided, the dimensions of the rib could not be accurately predicted.

Further, Japanese Patent Publication (A) No. 9-311114 discloses a method of predicting a PVT characteristic of a crystalline material in a non-heat equilibrium state of a crystalline material.

In general, the deformation caused by shrinkage of an injection molded article can be roughly classified into deformation due to shrinkage in solidification from a molten state liquid phase to solid phase, deformation due to shrinkage due to further crystallization of the solidified molding material, and deformation due to heat shrinkage accompanying a change in temperature of a solid phase from a high temperature state to a low temperature state. This shrinkage changes depending on the fluid state of the molding material or the temperature distribution at the time of deformation, so usually differs depending on the position inside the injection molded article. Further, if talc, glass fiber, or another filler having anisotropy is added to and dispersed in the molding material, due to that anisotropy, the anisotropy of the shrinkage rate of the injection molded article is enhanced. In this way, an injection molded article has a distribution of shrinkage rates.

However, the method of predicting the PVT characteristic described in Japanese Patent Publication (A) No. 9-311114 is not designed for the case where the molding material is comprised of a plastic and filler. The method of predicting the PVT characteristic of Japanese Patent Publication (A) No. 9-311114 precisely finds the PVT characteristic of the plastic part of the molding material, but does not precisely predict the distribution of shrinkage rates of an injection molded article to which a filler having anisotropy is added.

Further, Japanese Patent Publication (A) No. 9-311114 finds the crystallization degree in the non-heat equilibrium state by thermofluid field analysis, so is a time-consuming, troublesome technique and is not suited to the efficient design and production of an injection molded article.

SUMMARY OF THE INVENTION

Therefore, the present invention has as its task to solve the above problem and has as its object the provision of a method and apparatus for simply and accurately predicting an amount of deformation in a molded article deformed due to shrinkage.

To achieve this object, the method of predicting the amount of deformation due to shrinkage of a molded article of the present invention comprises finding a support point of a bending moment from a distribution of shrinkage rates of a molding material forming the molded article and using the support point to predict the amount of deformation.

Due to this, it is possible to simply and precisely predict an amount of deformation in a molded article deforming due to shrinkage. In particular, if the amount of deformation in the case where the molded article freely deforms, that amount of deformation can be predicted extremely simply.

Further, preferably the method of the present invention uses the support point to find the bending moment and uses the bending moment to predict the amount of deformation.

Due to this, even when the molded article does not freely deform, it is possible to precisely predict the amount of deformation due to shrinkage.

Further, preferably the method of the present invention determines the distribution of shrinkage rates from the orientation direction of the molding material.

Due to this, it is possible to easily determine the distribution of shrinkage rates of the molding material forming the molded article.

Further, in the method of the present invention, preferably the molded article is formed by injecting a molten state molding material into a mold in a state having velocity in a predetermined flow direction, then solidifying it. Further, the method of the present invention further comprises finding the orientation direction of the molding material from a distribution of velocity of the molten state molding material in the mold, the distribution determined based on a temperature distribution in a process of solidification of the molten state molding material in the mold. Due to this, the orientation direction can be simply found.

Still further, in the method of the present invention, preferably the molded article has a base on which a rib is provided, and a cross point of an extension direction of virtual extension toward the base side of a region where a distribution of shrinkage rates of the molding material forming the rib becomes discontinuous and a region where a distribution of shrinkage rates of the molding material forming the base becomes discontinuous in a cross-section of the molded article substantially perpendicular to the rib and including the rib is made the support point of the bending moment causing the rib to deform. Due to this, it is possible easily and precisely find the amount of deformation of a rib of a molded article having a base on which a rib is provided.

Further, in the method of the present invention, preferably the support point is a point of inflection of a path drawn by a center of an inscribed circle in a cross-section of the molded article substantially perpendicular to the rib and including the rib. Due to this, it is possible to predict the amount of deformation of a molded article more simply.

Further, in the method of the present invention, preferably the support point is an intersection of a line bisecting a thickness of the base and a line bisecting a thickness of the rib in a cross-section of the molded article substantially perpendicular to the rib and including the rib. Due to this, it is possible to predict the amount of deformation of a molded article more simply.

Further, in the method of the present invention, preferably the support point is a point of inflection of a path drawn by a location where the temperature gradient is zero when the molten state molding material solidifies in a cross-section of the molded article substantially perpendicular to the rib and including the rib. Due to this, it is possible to predict the amount of deformation of a molded article more simply.

Further, in the method of the present invention, preferably the molded article is an injection molded article. Due to this, it is possible to predict the amount of deformation of a molded article simply and precisely.

Further, the apparatus for predicting an amount of deformation due to shrinkage of a molded article of the present invention is provided with a unit finding a support point of a bending moment from a distribution of shrinkage rates of a molding material forming a molded article and a unit using the support point to predict the amount of deformation due to shrinkage of the molded article. Due to this, in a molded article deforming due to shrinkage, it is possible to simply and precisely predict that amount of deformation. In particular, if an amount of deformation in the case where the molded article freely deforms, it is possible to predict the amount of deformation extremely simply.

Further, the apparatus of the present invention is provided with a unit using the support point to find the bending moment and a unit using the bending moment to predict the amount of deformation. Due to this, even when the molded article does not freely deform, it is possible to precisely predict the amount of deformation due to shrinkage.

BRIEF DESCRIPTION OF THE DRAWINGS

These and other features and advantages of the present invention will be better understood by reading the following detailed description taken together with the drawings, wherein:

FIG. 2B shows the state where the rib of FIG. 2A freely deforms due to shrinkage;

DESCRIPTION OF THE PREFERRED EMBODIMENTS

Figure 3A:
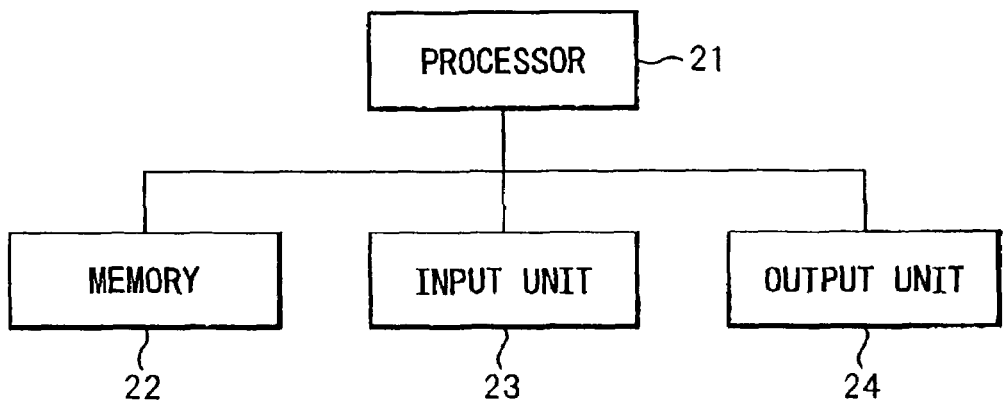
FIG. 3A shows the configuration of an apparatus for predicting the amount of deformation due to shrinkage of a molded article of an embodiment of the present invention.

Below, an embodiment of the present invention will be explained with reference to the drawings. FIG. 3A is a view of the configuration of an apparatus 20 of the present invention for predicting the amount of deformation due to shrinkage of a molded article. The apparatus 20 of the present embodiment (hereinafter also simply referred to as "the apparatus 20") is provided with a processor 21, a memory 22, an input unit 23, and an output unit 24.

Figure 3B:
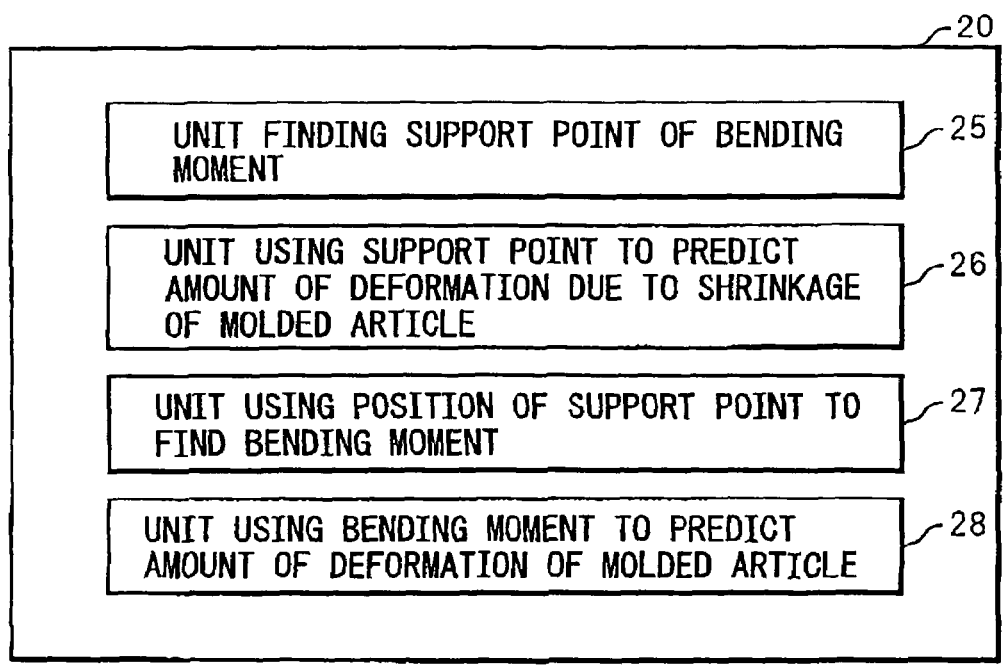
FIG. 3B is a block diagram of the functions of the apparatus of FIG. 3A.

The apparatus 20 is an apparatus predicting the amount of deformation due to shrinkage of the molded article 10. As shown in FIG. 3B, it is provided with a unit 25 finding a support point P of a bending moment M from a distribution of shrinkage rates of the molding material forming the molded article 10 and a unit 26 using the support point P to predict the amount of deformation due to shrinkage of the molded article 10.

The apparatus 20 will be explained below.

The processor 21 performs processing based on a deformation prediction program etc. stored in the memory 22 so as to compute the amount of deformation due to shrinkage of a molded article. The processor 21 for example can be configured by known hardware using a CPU.

The memory 22 is provided with an internal memory comprised of a memory etc. and an external memory comprised of a hard disk drive etc. This external memory stores the deformation prediction program, a shrinkage rate database provided with various shrinkage rates of the molding material used in the program, a structural analysis program for finding an amount of deformation from a bending moment of the inside of the molded article, etc. The internal memory is used as a work area when the processor 21 performs processing based on the various programs stored in the external memory.

The unit 25 finding the support point P of the bending moment M from the distribution of shrinkage rates of the molding material forming the molded article 10 and the unit 26 predicting the amount of deformation due to shrinkage of the molded article 10 using the support point P are realized by the processor 21 executing the deformation prediction program.

The input unit 23 is provided with a keyboard, mouse, etc. for input of the parameters etc. required when the processor 21 performs processing based on various types of programs. For example, it is possible to input the various shrinkage rates of molding materials used in the deformation prediction program directly from the input unit 23.

The output unit 24 is provided with a screen and printer etc. for output of the results of processing by the processor 21 etc.

Below, the apparatus 20 will be explained with reference to an example where the molded article is an injection molded article, but this explanation may be suitably applied even when predicting the amount of deformation of another molded article.

Next, a method of predicting the amount of deformation due to shrinkage of an injection molded article of the present invention used by the deformation prediction program in the apparatus 20 (hereinafter also simply referred to as "the present method") will be explained below.

This method finds the position of the support point P of the bending moment M from the distribution of shrinkage rates of the molding material forming the injection molded article and uses the position of the support point P to predict the amount of deformation of the injection molded article.

The injection molded article is formed by injecting a molten state molding material into a mold in a state having velocity in a predetermined flow direction, then solidifying it.

An injection molded article is for example produced in the following way. First, the plastic or other molding material is heated whereby a molten state is formed. Next, this molten state molding material is injected to a mold having a cavity of a predetermined shape and is solidified under a holding pressure, then the injection molded article is taken out from the mold.

Further, the molding material sometimes is made to include talc, glass fiber, or another filler having anisotropy so as to improve the strength of the injection molded article or add some functions.

Further, an injection molded article sometimes is accompanied with deformation due to shrinkage in the production process. The deformation due to this shrinkage in general may be roughly divided into deformation due to shrinkage in solidification from a molten state liquid phase to a solid phase, deformation due to shrinkage by further crystallization of the solidified molding material, and deformation due to heat shrinkage accompanying a temperature change in the solid phase from a high temperature state to a low temperature state. Such shrinkage changes depending on the fluid state of the molding material, the temperature distribution at the time of solidification, etc., so usually differs according to the position inside the injection molded article.

Further, if talc or glass fiber or another filler having anisotropy is added to and dispersed in the molding material, the anisotropy of the shrinkage in the injection molded article is enhanced due to that anisotropy. In this way, an injection molded article differs in shrinkage rate depending on the location, so has a distribution of shrinkage rates.

The above-mentioned distribution of shrinkage rates of a molding material is mainly determined by the oriented state of the polymer forming the plastic or the filler having anisotropy. Further, the oriented state of the molding material flowing after injection into the mold is mainly determined by the shear stress occurring due to the flow of the molding material. Further, this shear stress is determined by the distribution of the speed of the molding material in the cavity. This distribution of the speed is determined by the viscosity of the molding material in the fluid state. The viscosity of this molding material in general depends on the shear rate and temperature. In particular, the part with the high shear rate is the interface between the solidifying layer and fluid layer near the mold wall surfaces, so the distribution of this viscosity depends on the temperature distribution in the cavity.

Here, when a filler having anisotropy is dispersed in the plastic of the molding material, the filler is oriented to reduce the viscous resistance due to the flow. For example, talc is sometimes used as a filler. Talc usually is comprised of substantially elliptical plate-shaped particles. When this talc is used as a filler and the mold cavity has a plate shape, the talc is oriented so that its longitudinal direction matches the flow direction of the molding material and so that its plate-shaped surfaces become parallel to the plate-shaped surface of the mold. For that reason, in the planar direction and longitudinal direction of the talc, the strength of the molding material increases. Therefore, the injection molded article is suppressed in shrinkage in the planar direction of the talc matching the flow direction of the molding material due also to the oriented state of the polymer forming the plastic. However, it shrinks relatively greatly in a direction vertical to the plate-shaped surfaces of the talc. Further, the injection molded article also shrinks in the planar direction of the talc in a direction vertical to the flow direction of the molding material.

Further, when glass fiber having a needle shape is used as the filler, the glass fiber becomes oriented so that its longitudinal direction matches the flow direction of the molding material and greatly shrinks in a direction vertical to that longitudinal direction.

The temperature distribution inside the cavity changes along with time due to the transfer of heat to the mold from the molding material in the fluid state. That is, the molding material in the fluid state is cooled, increases in viscosity, and finally solidifies. The oriented state of the polymer forming the molding material or the oriented state of the filler having anisotropy is maintained in the state with this molding material solidified. In this way, the temperature distribution becomes a factor determining the oriented state of the molding material.

Therefore, the present method finds the orientation direction of the molding material from the distribution of the velocity of the molding material in the molten state in the mold and determines the distribution based on the temperature distribution in the process of the molten state molding material in the mold solidifying.

Figure 4:
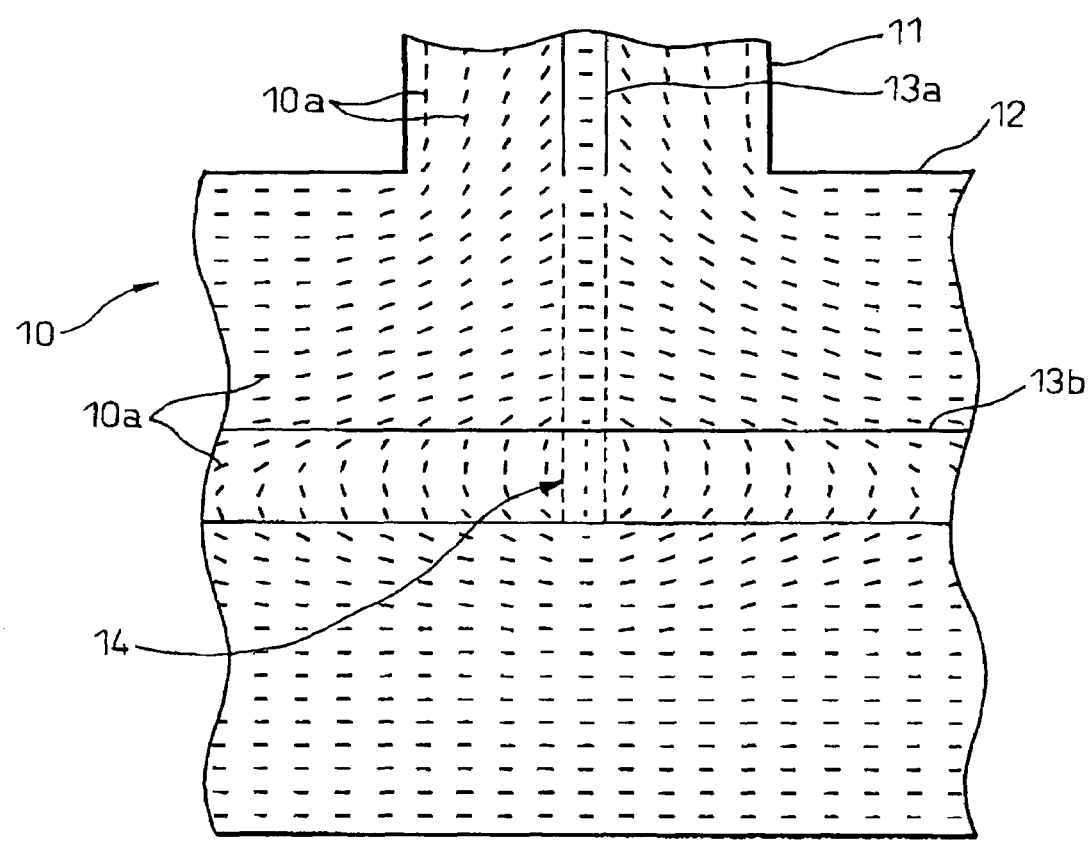
FIG. 4 is a schematic view showing the oriented state of a molding material of a molded article having a base on which a rib is provided.

First, to determine the distribution of shrinkage rates of the injection molded article from the orientation direction of the molding material, the inventors directly investigated the oriented state of the molding material, whereby they obtained the results shown in FIG. 4.

FIG. 4 shows the results of observation of an injection molded article 10 having a base 12 on which a rib 11 is provided by a cross-section C of the injection molded article 10 substantially perpendicular to the rib 11 and including the rib 11. This cross-section C is substantially perpendicular to the flow direction of the molding material. Note that "substantially perpendicular" includes the case of accurately perpendicular.

This injection molded article 10 has an upside-down T-shaped cross-section and is comprised of a plate-shaped base 12 on the top surface of which a similar plate-shaped rib 11 is provided at an angle of 90 degrees. The rib 11 has a vertically long shape from the front to rear side of the paper surface of FIG. 4. That is, the rib 11 is cut by the cross-section C substantially perpendicular to its longitudinal direction.

This injection molded article 10 is one produced by injection of a molten state molding material from the front to rear of the paper surface of FIG. 4. Further, the molding material of this injection molded article 10 is comprised of a plastic in which talc particles are dispersed as a filler.

Explaining this further, FIG. 4 schematically shows the oriented state of the filler when cutting the injection molded article 10 at the cross-section C, buffing it, then observing the cross-section C by an optical microscope. The cross-section C may also be observed using a scanning electron microscope (SEM) instead of an optical microscope.

At the rib 11, as shown in FIG. 4, the orientation of the surfaces of the talc 10a differs between the center of the rib 11 in the thickness direction and the two sides of the center. At the two sides of the center, the orientation of the surfaces of the talc 10a substantially matches with the direction of provision of the rib 11. It is learned that the molding material of the rib 11 is oriented substantially parallel to the two wall surfaces of the mold forming the rib 11. On the other hand, at the center of the rib 11 in the thickness direction, the surfaces of the talc 10a are oriented in a direction substantially perpendicular to the direction of provision of the rib 11. In this way, at the center of the rib 11 in the thickness direction, there is a region 13a where the orientation direction of the talc 10a becomes discontinuous.

At the base 12 as well, as shown in FIG. 4, the orientation of the surface of the talc 10a differs between the center of the base 12 in the thickness direction and the two sides of the center part. At the two sides of the center, the orientation of the surfaces of the talc 10a substantially matches the planar direction of the base 12. It is learned that the molding material of the base 12 is oriented substantially parallel to the two wall surfaces of the mold forming the base 12. On the other hand, at the center of the base 12 in the thickness direction, the surfaces of the talc 10a are oriented in the direction substantially vertical to the planar direction of the base 12. In this way, at the center of the base 12 in the thickness direction, there is a region 13b where the orientation direction of the talc 10a becomes discontinuous.

Further, at the part of the base 12 where the rib 11 is provided, the region 13a of the rib 11 extends toward the base 12 side until the region 13b of the base 12. That is, at the part of the base 12 in the extension direction where the rib 11 is virtually extended toward the base 12 side, that is, at the part shown by the broken line in FIG. 4, the talc 10a has an oriented state close to the talc 10a at the center of the rib 11 in the thickness direction.

In the present method, the distribution of shrinkage rates of the molding material of the injection molded article 10 is determined from the orientation direction of the talc 10a of this molding material. Further, the crossing point, in the cross-section C, of the direction of extension of virtual extension toward the base 12 side of the region 13a where the distribution of shrinkage rates of the molding material forming the rib 11 becomes discontinuous and the region 13b where the distribution of shrinkage rates of the molding material forming the base 12 becomes discontinuous is made the support point P of the bending moment M for making the rib deform. Note that "making the rib 11 deform" includes the case of making only the rib 11 deform and the case of also making the base 12 near the rib 11 deform.

From the oriented state of the talc 10a shown in FIG. 4, the deformation due to shrinkage of the base 12 of the injection molded article 10 is believed to occur at the rib 11 side from the region 13b of the base 12.

The apparatus 20 is provided with three means for finding the support point P of the bending moment M from the distribution of shrinkage rates of the molding material forming the injection molded article 10. When predicting the amount of deformation due to shrinkage of the injection molded article 10, it is preferable to suitably select the means used from among the three means in accordance with the production conditions of the injection molded article or the dimensional precision required from the injection molded article.

Below, the individual means will be explained. First, the first means for finding the support point P of the bending moment M, as shown in FIG. 5, is one where the support point P is the point of inflection of the path L1 drawn by the center of the inscribed circle 15 in the cross-section C of the injection molded article 10 substantially perpendicular to the rib 11 and including the rib 11.

The condition for using the first means is that the cooling ability of the mold used for the production of the injection molded article 10 be sufficiently large and the temperature of the surface of the mold cavity be deemed constant in the process of solidification of the molding material in the molten state. With injection molding, heat is transferred to the mold from the molten state molding material injected into the mold. For example, near the joined part of the rib 11 and base 12, the heat capacity of the mold with respect to the contact area of the molding material with the mold is smaller than at other parts, the amount of heat transferred from the molding material per unit area of the mold becomes larger, and the temperature of the mold near the joined part tends to become higher than other parts. However, in the first means, the temperature of the surface of the mold cavity is deemed to be constant regardless of the shape of the mold.

Under the above-mentioned condition, the path, in the cross-section C, of the part where the temperature gradient becomes zero in the molding material in the process of solidification from the molten state is obtained as the path L1 drawn by the center of the inscribed circle 15. The distribution of shrinkage rates of the molding material is determined from the oriented state of the molding material based on this temperature distribution. Further, the point of inflection of the path L1 drawn by the center of the inscribed circle 15 in the cross-section C is considered the support point P.

Figure 5:
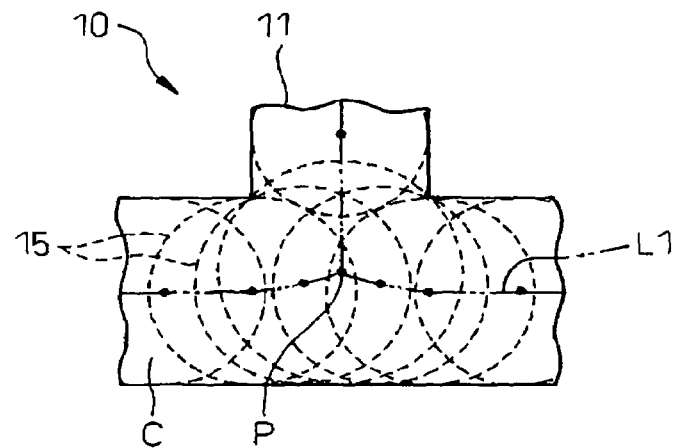
FIG. 5 is a view showing a support point used in processing of a first means for finding the support point of the bending moment.
Figure 6A:
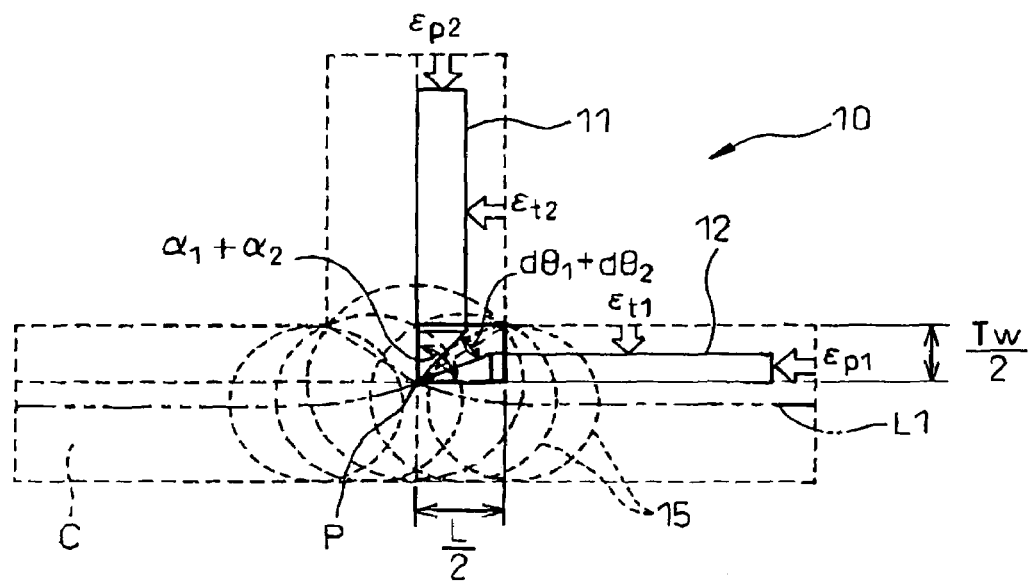
FIG. 6A is a view of the geometric model of FIG. 5.

FIG. 6A shows a geometric model of the case where an injection molded article 10 having the shape of the mold cavity of the cross-section shown in FIG. 5 deforms due to shrinkage. FIG. 6A is a view for explaining the relationship between the bending moment M making the rib 11 of the injection molded article 10 freely deform and the slant angles $d\theta_1$ and $d\theta_2$ at that time. In FIG. 6A, the shape of the deformed injection molded article 10 is shown by the solid line, while the shape before deformation is shown by the broken line. FIG. 6A shows the state of formation of a gap in the vicinity of the joined part of the rib 11 and the base 12 due to the free deformations of the rib 11 and base 12 due to shrinkage. In actuality, as explained above, such a gap does not necessarily occur. Here, to clearly show the slant angles $d\theta_1$ and $d\theta_2$, the view shown in FIG. 6A is used. The same is true in FIG. 8A and FIG. 10A.

Note that in FIG. 6A, the deformation due to shrinkage of the injection molded article 10 is shown only for one side of the rib 11.

Figure 6B:
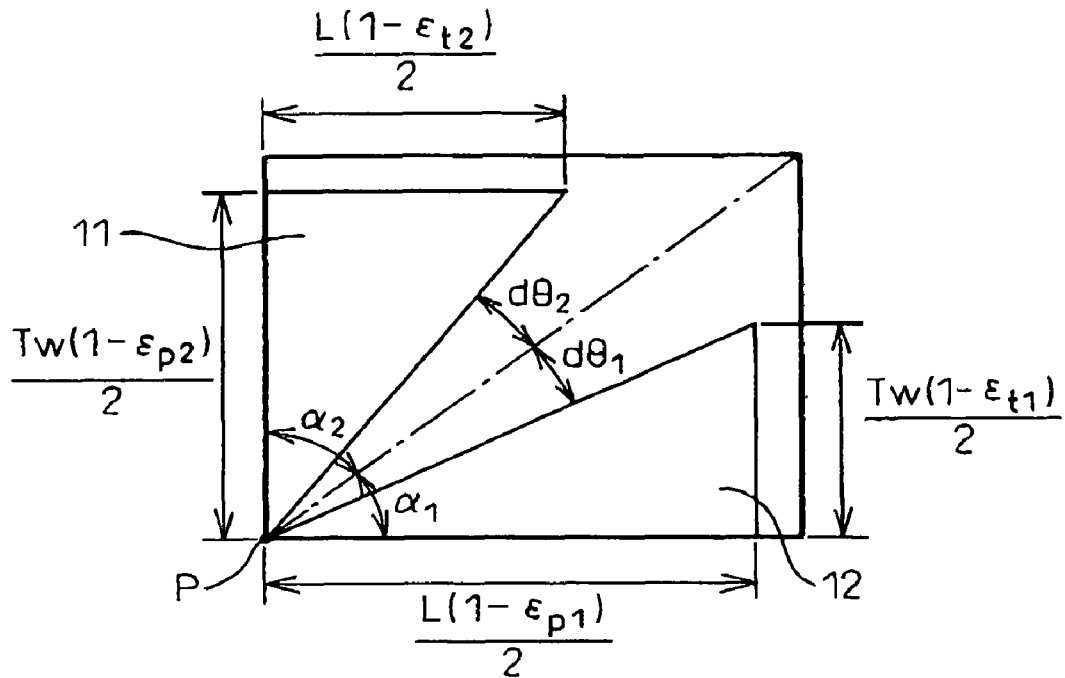
FIG. 6B is an enlarged view of principal parts of FIG. 6A.

FIG. 6B shows principal parts of FIG. 6A. Specifically, FIG. 6B shows a view enlarging the vicinity of a joined part of the rib 11 and the base 12, but is similar in other parts as well.

The base 12 shrinks in the thickness direction by the shrinkage rate of $\epsilon_{t1}$ and shrinks in the direction perpendicular to the flow direction of the molding material, that is, the planar direction, by a shrinkage rate of $\epsilon_{p1}$. Further, the rib 11 shrinks in the thickness direction by a shrinkage rate of $\epsilon_{t2}$ and shrinks in the direction perpendicular to the flow direction of the molding material, that is, the planar direction, by a shrinkage rate of $\epsilon_{p2}$.

In FIG. 6B, the state where the part of the base 12 in the extension direction with the rib 11 virtually extended toward the base 12 side also shrinks by shrinkage rates of $\epsilon_{t2}$ and $\epsilon_{p2}$ is shown. This is because it is judged from the results shown in FIG. 4 that this part has a shrinkage rate similar to the rib 11.

Due to the free deformation caused by such shrinkage of the injection molded article 10, at the vicinity of the joined part, the base 12 side deforms with an angle of the slant angle $d\theta_1$, while the rib 11 side deforms with an angle of the slant angle $d\theta_2$.

Figure 1A:
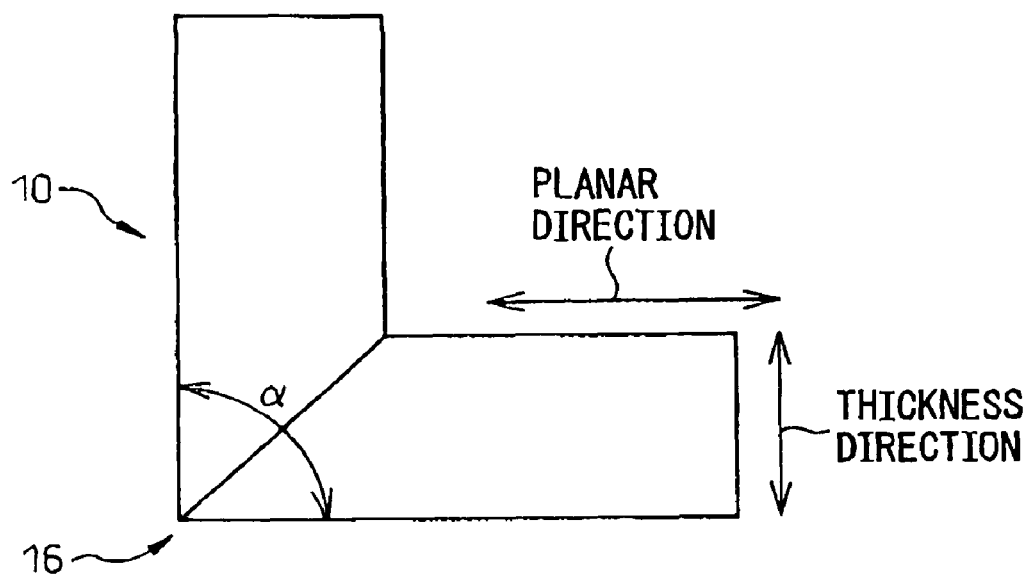
FIG. 1A is a view for explaining deformation of a corner according to an example of the related art and shows the state before deformation of the corner.
Figure 1B:
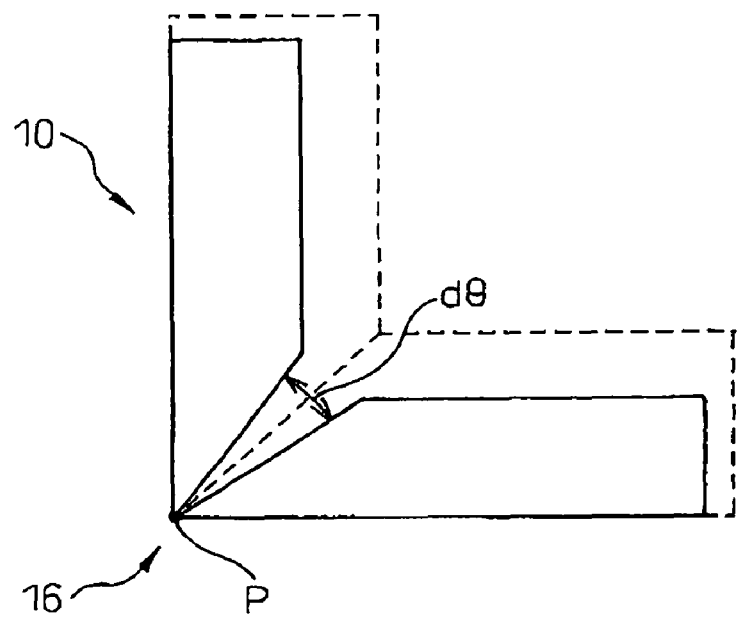
FIG. 1B shows the state where the corner of FIG. 1A freely deforms due to shrinkage.
Figure 1C:
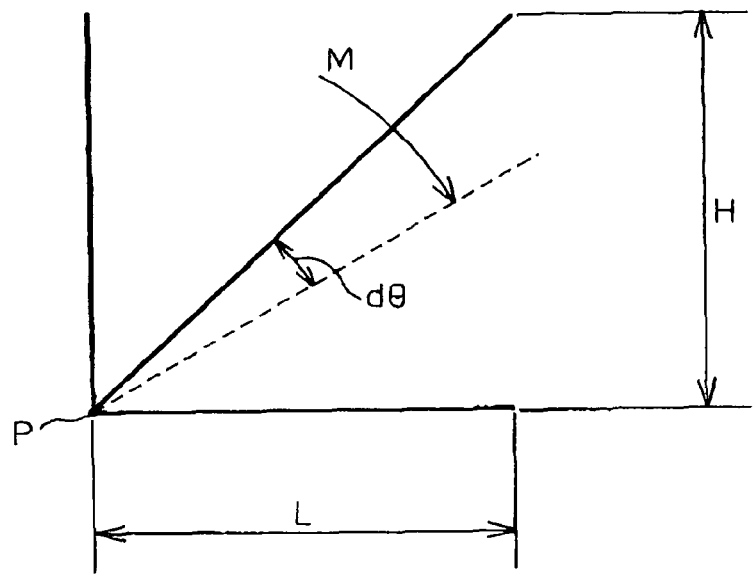
FIG. 1C is a view of a geometric model of FIG. 1B.
Figure 2A:
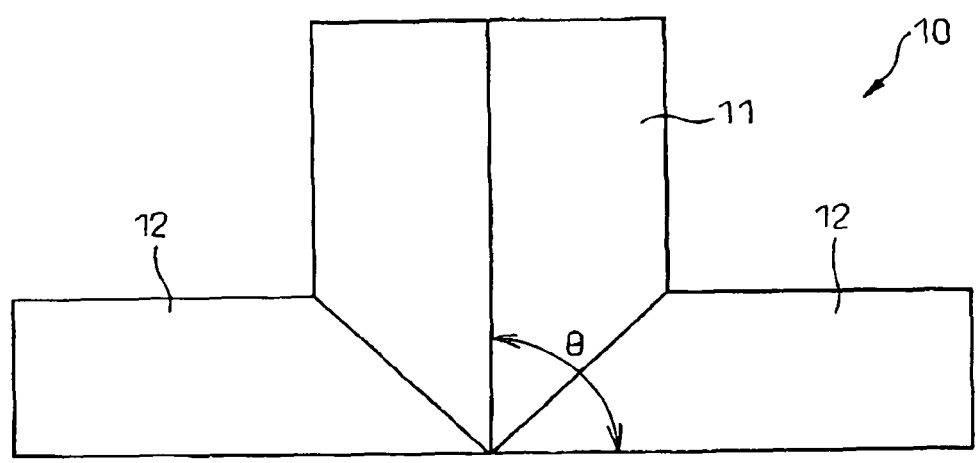
FIG. 2A is a view for explaining deformation of a rib and shows the state before deformation of the rib.

At both the base 12 side and rib 11 side, the deformations occur starting from the support point P of the bending moment M. This support point P, unlike in FIG. 2B, is positioned inside the base 12.

Here, as shown in FIG. 6B, if the apex angle of the base 12 side before deformation is $\alpha_1$, the apex angle of the rib 11 side before deformation is $\alpha_2$, the thickness of the base 12 before deformation is H, and the thickness of the rib 11 before deformation is L, the apex angles $\alpha_1$ and $\alpha_2$ and the slant angles $d\theta_1$ and $d\theta_2$ are expressed from the following formulas (3) from (6). Note that the H, L, $\alpha_1$, and $\alpha_2$ are dimensions in the case where the injection molded article 10 does not shrink and does not deform and correspond to the shape of the mold cavity.

$$\alpha_1 = \tan^{-1}\left(\frac{T_w}{L}\right) \tag{3}$$

$$\alpha_2 = \tan^{-1}\left(\frac{L}{T_w}\right) \tag{4}$$

$$d\theta_1 = \alpha_1 - \tan^{-1}\left\{\frac{T_w(1-\epsilon_{t1})}{L(1-\epsilon_{p1})}\right\} \tag{5}$$

$$d\theta_2 = \alpha_2 - \tan^{-1}\left\{\frac{L(1-\epsilon_{p2})}{T_w(1-\epsilon_{t2})}\right\} \tag{6}$$

The $T_w$ in the formulas (5) and (6) shows the position of the support point P in the thickness direction of the base 12. $T_w$ is expressed by the following formula (7) from the geometric model of the inscribed circle in the vicinity of the joined part.

$$T_w = H - \frac{L^2}{H} \tag{7}$$

Further, the bending moment $M_1$ acting at the base 12 side about the support point P and the bending moment $M_2$ acting at the rib 11 side about the support point P are expressed by the following formulas (8) and (9) using the formulas (5) and (6).

$$M_1 = E_1 \cdot \frac{T_w^3}{48} \cdot \frac{\tan d\theta_1}{L(1-v_1^2)} \tag{8}$$

$$M_2 = E_2 \cdot \frac{L^3}{48} \cdot \frac{\tan d\theta_2}{T_w(1-v_2^2)} \tag{9}$$

Here, $E_1$ indicates the Young's modulus at the base 12 side, while $E_2$ is the Young's modulus at the rib 11 side. Further, $v_1$ indicates the Poisson ratio of the base 12 side, while $v_2$ indicates the Poisson ratio of the rib 11 side.

In the formula (8), the position of the support point of the bending moment is not strictly the point of inflection of the path L1 drawn by the center of the inscribed circle 15. The support point in formula (8) is at a position of half of the thickness $H(1-\epsilon_{t1})/2$ at the base 12 side in FIG. 6B. Therefore, next, the position of this support point is corrected to correct the formula of the bending moment.

The formula of the bending moment can be corrected for example in the following way. If the distance between the accurate position of the support point P of the bending moment M and the position of the support point at the formula (8) is S, the cross-sectional secondary moment is $I_z$, and the cross-sectional area is A, the corrected cross-sectional secondary moment $I_z'$ is expressed by the following formula (10):

$$I_z' = I_z + AS^2 \tag{10}$$

Here, $I_z$ is the cross-sectional secondary moment of a rectangular shape with a length of one side of $H(1-\epsilon_{t1})/2$ and a length of the other side of the unit length, while A is the area of this rectangular shape. The formula (9) can be similarly corrected. Note that depending on the prediction precision of the amount of deformation sought, it is not always necessary to correct the above-mentioned bending moment.

Further, $\epsilon_{p1}$ and $\epsilon_{p2}$ in general sometimes differ depending on the planar position even in the planar direction of the injection molded article. The injection molded article has a distribution of shrinkage rates in the planar direction. However, when the amount of change of the shrinkage rate is small, $\epsilon_{p1}$ and $\epsilon_{p2}$ may also be deemed uniform in the planar direction, so the apparatus 20 considers these to be uniform. Similarly, $\epsilon_{t1}$ and $\epsilon_{t2}$ were considered uniform in the thickness direction. Further, in general, these shrinkage rates change depending on the thickness of the rib 11 or the base 12.

In the apparatus 20, the values of $\epsilon_{p1}$, $\epsilon_{p2}$, $\epsilon_{t1}$, and $\epsilon_{t2}$ are provided as a database. The inventors used molding materials comprised of various types of fillers and plastics to prepare injection molded articles changed in thickness of the base or rib, investigated the values of their shrinkage rates, and prepared a shrinkage rate database. In the apparatus 20, the data of the necessary shrinkage rate is selected from this shrinkage rate database and that data is used by the deformation prediction program.

The above-mentioned slant angles $d\theta_1$ and $d\theta_2$ are values corresponding to the amount of deformation when the rib 11 freely deforms. That is, they show the state of the rib 11 due to shrinkage of the injection molded article 10 acting without that shrinkage force being obstructed. On the other hand, an actual injection molded article has rigidity and one end or both ends of the rib 11 in the longitudinal direction are fixed, so free deformation of the rib 11 is not necessarily allowed.

In this way, when free deformation is not allowed, the injection molded article 10 experiences internal stress from that shrinkage force and deforms due to that internal stress. The amount of deformation due to this internal stress can be predicted by using the position of the support point P to find the bending moment M and using that bending moment M.

Specifically, by using formulas (8) and (9) of the bending moment M or formulas of these corrected as explained above to perform structural analysis calculations, it is possible to find the amount of deformation due to shrinkage of the injection molded article 10. These structural analysis calculations can be performed using for example a known structural analysis program.

In the apparatus 20, the external memory of the memory 22 stores the structural analysis program. Further, in the apparatus 20, when the rib 11 of the injection molded article 10 cannot freely deform, the processor 21 uses the slant angles $d\theta_1$ and $d\theta_2$ to find the bending moment M, performs processing based on the structural analysis program using the bending moment M, and calculates the amount of deformation of the rib 11 of the injection molded article 10. In this way, the apparatus 20, as shown in FIG. 3B, has a unit 27 using the position of the support point P to find the bending moment M and a unit 28 using the bending moment M to predict the amount of deformation of the injection molded article 10. The function of this unit 28 may also be provided by the unit 26 using the support point P to predict the amount of deformation of the injection molded article 10.

The unit 27 using the position of the support point P to find the bending moment M and the unit 28 using the bending moment M to predict the amount of deformation of the injection molded article 10 are realized by the processor 21 executing a predetermined program.

Further, in the apparatus 20, after the amount of deformation of the injection molded article 10 is is calculated by the processor 21, the output unit 24 outputs the calculated amount of deformation to the screen or from a printer.

Further, in the apparatus 20, when using the first, means finding the support point P of the bending moment M, the input unit 23 gives the processor 12 an instruction to select the first means.

Next, the second means for finding the support point P of the bending moment M in the apparatus 20 will be explained with reference to FIG. 7 to FIG. 8B. The second means is one using the fact that the support point P is the intersection between the line L2 bisecting the thickness of the base 12 and the line L3 bisecting the thickness of the rib 11 in the cross-section C of the molded article 10 substantially perpendicular to the rib 11 and including the rib 11. Below, the points of difference from the above-mentioned first means will be explained.

The second means is a technique for obtaining the support point P in an approximate manner. To use the second means, in addition to the condition described for the first means, the following condition must be satisfied.

The condition sought from the second means is that the shape of the mold cavity be thin, specifically, that the thickness of the plate-shaped rib 11 and the thickness of the plate-shaped base 12 be small.

When these two conditions are satisfied, the polymer forming the plastic and filler of the molding material are mainly oriented along the wall surface in the mold. Further, the support point P of the bending moment M, as shown in FIG. 7, can be made the intersection between the line L2 bisecting the thickness of the base 12 and the line L2 bisecting the thickness of the rib 11 in the cross-section C. That is, this intersection may be deemed the crossing point 14.

The second means is particularly preferably used in the case where, in addition to the above two conditions, the thickness L of the rib 11 and the thickness H of the base 12 satisfy the relationship of L/H≦0.66.

Figure 7:
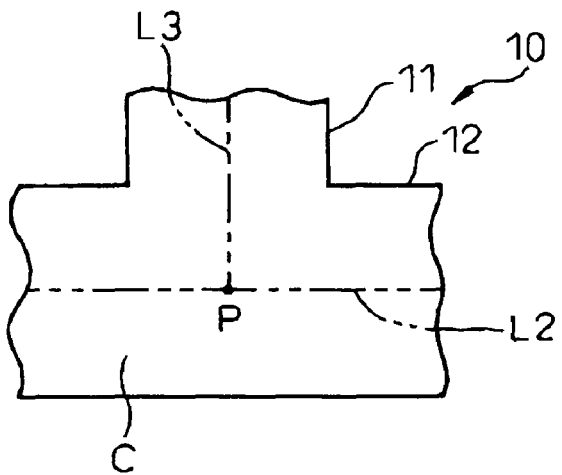
FIG. 7 is a view showing a support point used in processing of a second means for finding the support point of the bending moment.
Figure 8A:
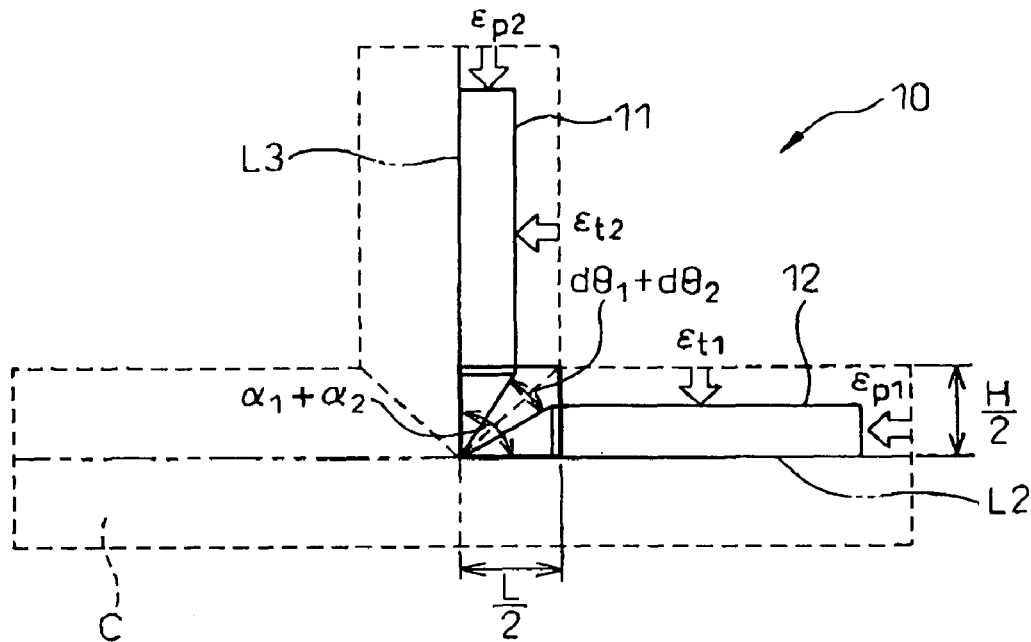
FIG. 8A is a view of the geometric model of FIG. 7.
Figure 8B:
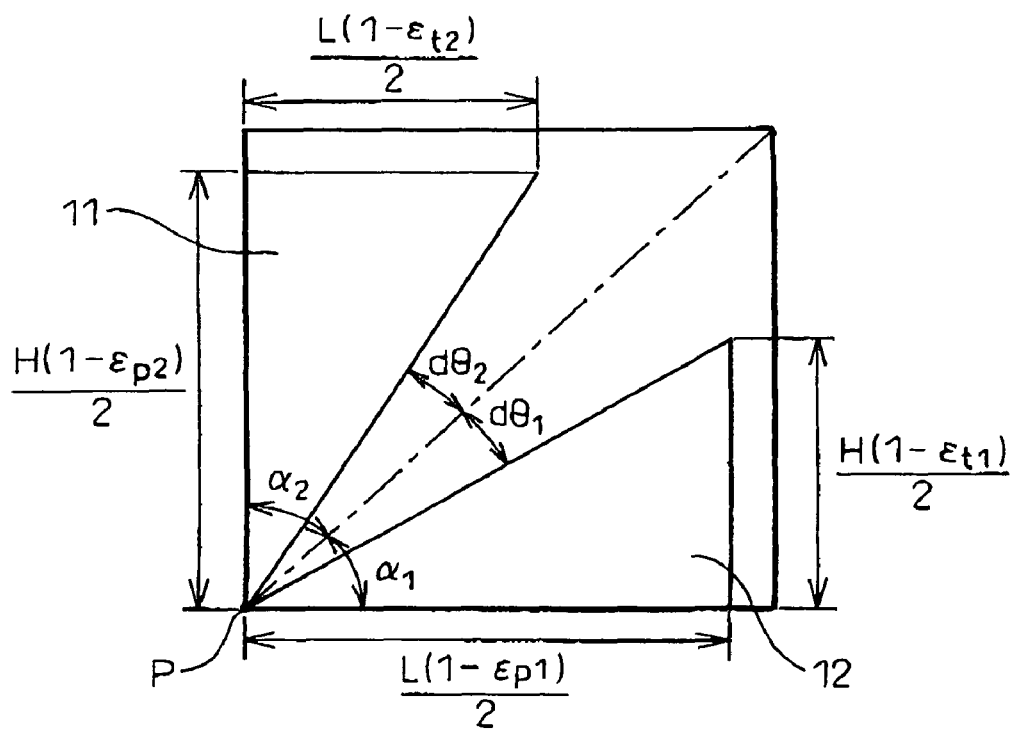
FIG. 8B is an enlarged view of principal parts of FIG. 8A.

FIG. 8A and FIG. 8B show a geometric model in the case where an injection molded article 10 having the shape of the mold cavity of the cross-section shown in FIG. 7 deforms due to shrinkage. Here, the apex angles $\alpha_1$ and $\alpha_2$ and slant angles $d\theta_1$ and $d\theta_2$ shown in FIG. 8B are expressed by the following formulas (11) to (14).

$$\alpha_1 = \tan^{-1}\left(\frac{H}{L}\right) \tag{11}$$

$$\alpha_2 = \tan^{-1}\left(\frac{L}{H}\right) \tag{12}$$

$$d\theta_1 = \alpha_1 - \tan^{-1}\left\{\frac{H(1-\varepsilon_{t1})}{L(1-\varepsilon_{p1})}\right\} \tag{13}$$

$$d\theta_2 = \alpha_2 - \tan^{-1}\left\{\frac{L(1-\varepsilon_{p2})}{H(1-\varepsilon_{t2})}\right\} \tag{14}$$

Further, the bending moment $M_1$ acting on the base 12 side from the support point P and the bending moment $M_2$ acting on the rib 11 side from the support point P are expressed by the following formulas (15) and (16) using the formulas (13) and (14).

$$M_1 = E_1 \cdot \frac{H^3}{48} \cdot \frac{\tan d\theta_1}{L(1-v_1^2)} \tag{15}$$

$$M_2 = E_2 \cdot \frac{L^3}{48} \cdot \frac{\tan d\theta_2}{H(1-v_2^2)} \tag{16}$$

Next, in the same way as the first means, the position of the support point is corrected to correct the formula of the bending moment. Note that depending on the prediction precision of the amount of deformation sought, it may not be necessary to correct this bending moment.

Note that when the shape of the mold cavity is thin, the difference between the support point P by the second means and the support point P by the first means becomes smaller and thereby the results when using the second means become approximately the same as with the first means.

Finally, the third means for finding the support point P of the bending moment M in the apparatus 20 will be explained below with reference to FIG. 9 to FIG. 10C. This third means, as shown in FIG. 10A, is one using the fact that the support point P is the point of inflection of the path L4 drawn by the location where the temperature gradient is zero when the molten state molding material solidifies in the cross-section C of the molded article 10 substantially perpendicular to the rib 11 and including the rib 11. Below, the points of difference from the first means will be explained.

Figure 9:
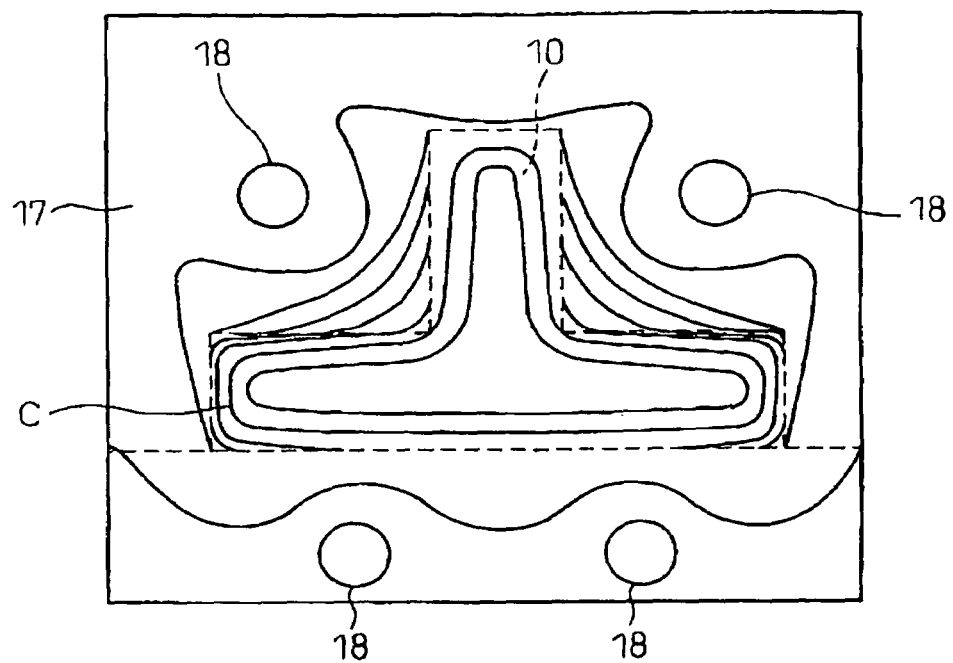
FIG. 9 is a view showing the temperature distribution of a mold producing an injection molded article.
Figure 10A:
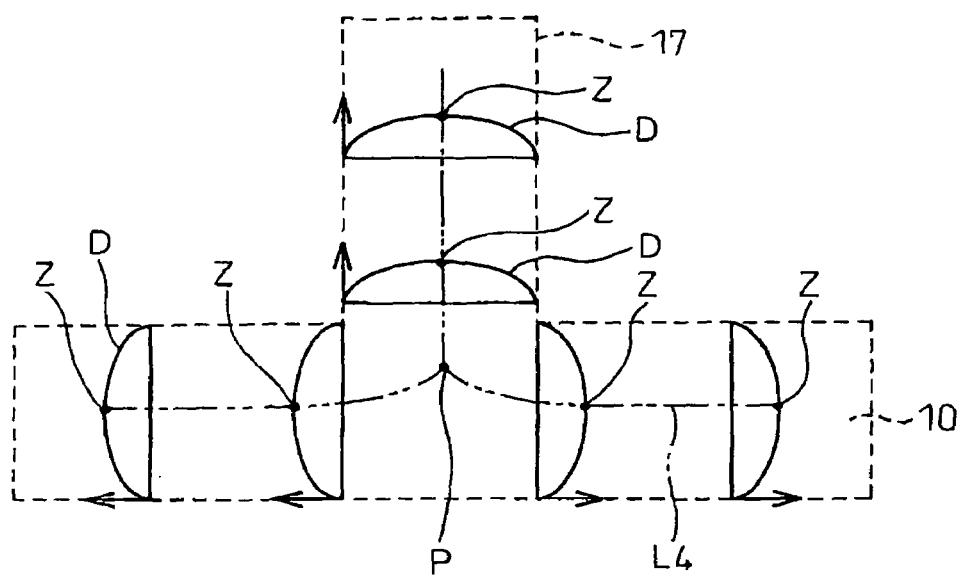
FIG. 10A is a view showing a support point used in the processing of a third means for finding the support point of a bending moment.

The third means is used in the case where the temperature of the cavity surface of the mold 17 used for formation of the injection molded article 10, as shown in FIG. 9, is not constant in the process of solidification of the molten state molding material. This third means, unlike the first means, is preferably used for the case where the mold stores the heat transferred from the molding material and has an uneven temperature distribution.

FIG. 9 shows one example of the temperature distribution in the case of cutting the mold 17 along the cross-section C of the injection molded article 10. Specifically, FIG. 9 shows the temperature distribution of the state immediately before taking out the injection molded article 10 from the mold 17. The mold 17 is formed to be able to be split into a top and bottom half. A plurality of cooling pipes 18 are arranged. Cooling water circulates through these cooling pipes 18.

In FIG. 9, the parts of equal temperature are connected by isotherms. Between the adjoining isotherms, the temperature differs by 6° C. In the example of FIG. 9, the temperature of the center of the injection molded article 10 is approximately 80° C., while the temperature of the cooling water is approximately 20° C. The cavity surface of the mold 17 is shown by the broken lines. It will be understood that the surface temperature of the mold 17 differs depending on the location.

The distribution of shrinkage rates of the molding material is determined from the oriented state of the molding material based on this temperature distribution. Further, the point of inflection of the path L4 in the cross-section C is considered the support point P.

FIG. 10A shows the temperature gradient D of the molding material inside the mold 17 based on FIG. 9. This temperature gradient D becomes sharper the further to the wall surfaces of the mold 17 and on the other hand becomes gentler the further to the center of the cavity. A path L4 is formed by connecting the locations Z where this temperature gradient becomes zero.

The path L4 is the path in the cross-section C of a location where the temperature gradient is zero in the molding material in the process of solidification from the molten state. This path L4 can be found by thermofluid field analysis calculations or another known method. In the apparatus 20, the external memory of the memory 22 stores a program for thermofluid field analysis calculations. If the third means is selected, the processor 21 first performs processing based on this thermofluid field analysis program to find the path L4. Next, the processor 21 obtains the position of the support point P from the path L4, then uses this position to perform processing based on the deformation prediction program to find the slant angle. Note that the thermofluid field analysis calculations may also be performed using another apparatus than the apparatus 20.

Figure 10B:
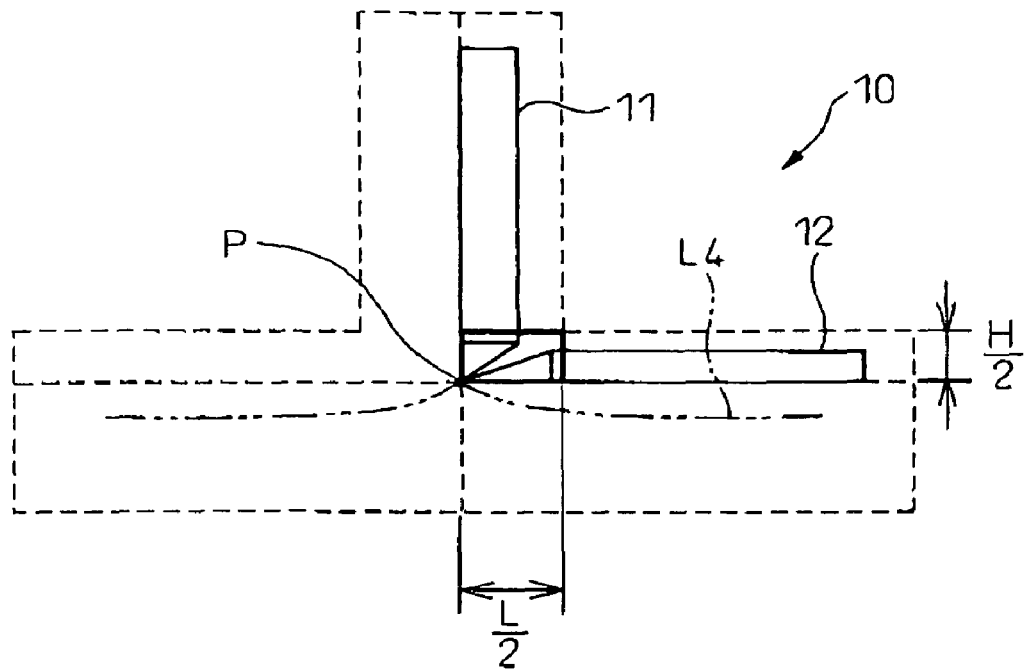
FIG. 10B is a view of the geometric model of FIG. 10A.
Figure 10C:
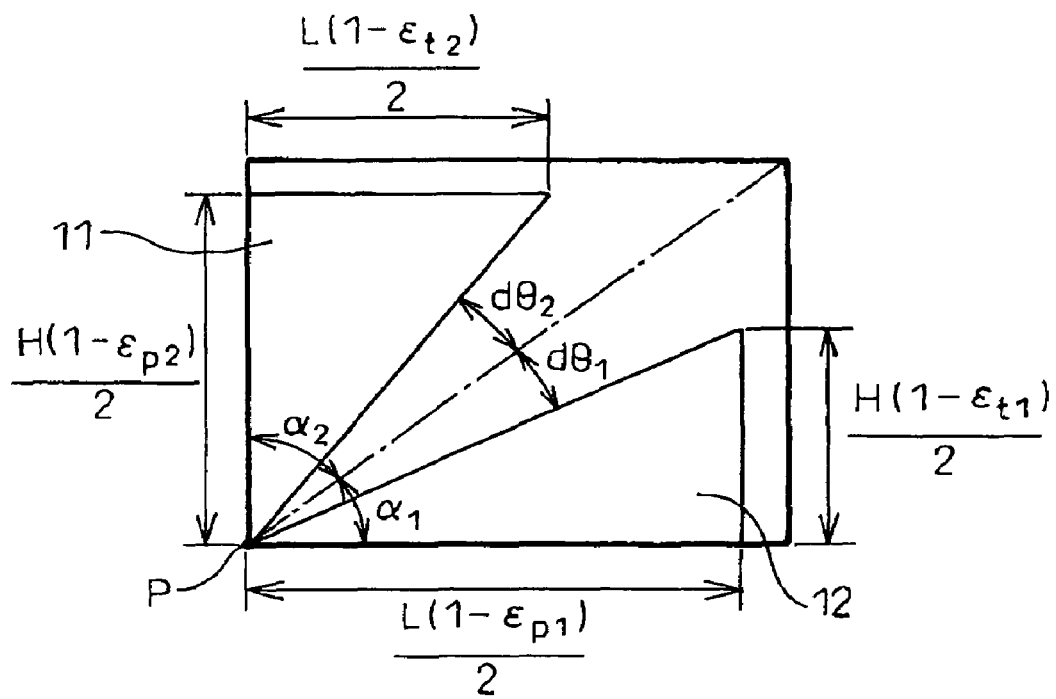
FIG. 10C is an enlarged view of principal parts of FIG. 10B.

FIG. 10B shows a geometric model of the case where an injection molded article 10 having the shape of the mold cavity of the cross-section shown in FIG. 10A deforms due to shrinkage. Here, the apex angles $\alpha_1$ and $\alpha_2$ and slant angles $d\theta_1$ and $d\theta_2$ shown in FIG. 10C are expressed by the following formulas (17) to (20):

$$\alpha_1 = \tan^{-1}\left(\frac{H}{L}\right) \tag{17}$$

$$\alpha_2 = \tan^{-1}\left(\frac{L}{H}\right) \tag{18}$$

-continued $$d\theta_1 = \alpha_1 - \tan^{-1}\left\{\frac{H(1-\varepsilon_{t1})}{L(1-\varepsilon_{p1})}\right\} \quad (19)$$

$$d\theta_2 = \alpha_2 - \tan^{-1}\left\{\frac{L(1-\varepsilon_{p2})}{H(1-\varepsilon_{t2})}\right\} \quad (20)$$

Further, the bending moment $M_1$ acting at the base 12 side about the support point P and the bending moment $M_2$ acting at the rib 11 side about the support point P are expressed by the following formulas (21) and (22) using the formulas (19) and (20).

$$M_1 = E_1 \frac{H^3}{48} \frac{\tan d\theta_1}{L(1-v_1^2)} \quad (21)$$

$$M_2 = E_2 \frac{L^3}{48} \frac{\tan d\theta_2}{H(1-v_2^2)} \quad (22)$$

Next, in the same way as the first means, the position of the support point is corrected to correct the formula of the bending moment. Note that depending on the prediction precision of the amount of deformation sought, it may not be necessary to correct this bending moment.

Note that if using the third means for the case where the temperature of the surface of the mold is constant, results the same as the first means are obtained.

According to the above apparatus 20, it is possible to simply and precisely predict the amount of deformation due to shrinkage. Therefore, since the injection molded article and that mold are designed after predicting the amount of deformation due to shrinkage, the dimensional precision of the injection molded article is improved. Further, the apparatus 20 is provided with three means for finding the support point P of the bending moment M, so an injection molded article corresponding to the required dimensional precision can be designed, therefore the design time can be optimized.

Further, the apparatus 20 enables the shape of an injection molded article with little amount of deformation to be designed in advance, so can reduce the number of times of fabrication of prototypes and thereby reduce the manufacturing costs.

Above, a preferable embodiment of the present invention was explained, but the method and apparatus of the present invention is not limited to the above-mentioned embodiment.

For example, the present invention was explained with reference to the example of an injection molded article, but the present invention can be applied to any case where a fluid molding material, for example, a molten state plastic, is molded by a predetermined speed. A fluid molding material, for example, a plastic or filler, is oriented in that flow direction, so if cooled as is with that oriented state, shrinkage due to that oriented state will occur. The present invention provides a method and apparatus for predicting the amount of deformation of the molded article due to such shrinkage by finding the support point of the bending moment from the distribution of shrinkage rates and using this support point. The location of deformation of the molded article need not be the part of a base where ribs are provided.

As the molding material, in addition to a plastic, a ceramic may be mentioned.

Further, the molded article includes, in addition to injection molded articles, injection compression molded articles formed by injection compression molding and extruded articles formed by extrusion. Further, it includes so-called injection foam molded articles obtained by dissolving a chemical forming agent, $N_2$, $CO_2$, etc. in the molding material for causing it to foam or bonding these and causing foaming in the mold after injection.

Further, in the above-mentioned embodiment, the explanation was given of the case where the molding material included a filler having anisotropy, but when a filler having anisotropy is not included, it is possible to find the support point P of the bending moment M from the shrinkage rate of the plastic etc. forming the molding material, and use the position of the support point P to predict the amount of deformation of the molding material. The shrinkage rate of a molded material is determined by the oriented state of the polymer forming the plastic of the molding material for example.

Further, when a thermosetting material, for example, a thermosetting plastic, is used as the molding material, a molding material in a fluid state at ordinary temperature is injected into the mold, the molding material is heated together with the mold to cause the molding material to cure, then the injection molded article is cooled and taken out from the mold. In this case as well, the shrinkage rate of the injection molded article changes depending on the oriented state of the plastic forming the molding material or filler having anisotropy. Therefore, the above explanation can be suitably applied even when predicting the amount of deformation due to shrinkage of a thermosetting material.

Further, in the above-mentioned embodiment, the rib 11 was provided at the base 12 by an angle of 90 degrees, but the rib 11 may be provided at the base 12 by an angle smaller than 90 degrees as well.

Further, in the above-mentioned embodiment, three means were provided for finding the support point P of the bending moment M, but it is also possible to add to the apparatus 20 another means for finding the support point P.

Furthermore, a molded article designed using the method or apparatus of the present invention is high in dimensional precision, so it is possible to use a method of production of a molded article using the method or apparatus of the present invention in the production of a molded article.

What is claimed is:

1. A method of predicting an amount of deformation due to shrinkage of a molded article comprising:
   a processor finding a support point of a bending moment from a distribution of shrinkage rates of a molding material forming the molded article;
   the processor using said support point to find said bending moment; and
   the processor using said bending moment to predict said amount of deformation,
   wherein said molded article has a base on which a rib is provided, and a cross point of an extension direction of virtual extension toward the base side of a region where a distribution of shrinkage rates of the molding material forming the rib becomes discontinuous and a region where a distribution of shrinkage rates of said molding material forming said base becomes discontinuous in a cross-section of said molded article substantially perpendicular to said rib and including said rib is made said support point of said bending moment causing said rib to deform.

2. A method as set forth claim 1, further comprising the processor determining said distribution of shrinkage rates from an orientation direction of said molding material.

3. A method as set forth in claim 2, wherein said molded article is formed by injecting a molten state molding material into a mold in a state having velocity in a predetermined flow direction, then solidifying it.

4. A method as set forth in claim 3, further comprising the processor finding said orientation direction of said molding material from a distribution of velocity of said molten state molding material in said mold, said distribution determined based on a temperature distribution in a process of solidification of said molten state molding material in said mold.

5. A method as set forth in claim 1, wherein said support point is a point of counterflexure of a path drawn by a center of an inscribed circle in a cross-section of said molded article substantially perpendicular to said rib and including said rib.

6. A method as set forth claim 1, wherein said support point is an intersection of a line bisecting a thickness of said base and a line bisecting a thickness of said rib in a cross-section of said molded article substantially perpendicular to said rib and including said rib.

7. A method as set forth claim 1, wherein said support point is a point of counterflexure of a path drawn by a location where the temperature gradient is zero when said molten state molding material solidifies in a cross-section of said molded article substantially perpendicular to said rib and including said rib.

8. A method as set forth in claim 1, wherein said molded article is an injection molded article.

9. An apparatus for predicting an amount of deformation due to shrinkage of a molded article provided with:
- a unit finding a support point of a bending moment from a distribution of shrinkage rates of a molding material forming a molded article,
- a unit using said support point to find said bending moment, and
- a unit using said bending moment to predict said amount of deformation,
- wherein said molded article has a base on which a rib is provided, and
- a cross point of an extension direction of virtual extension toward the base side of a region where a distribution of shrinkage rates of the molding material forming the rib becomes discontinuous and a region where a distribution of shrinkage rates of said molding material forming said base becomes discontinuous in a cross-section of said molded article substantially perpendicular to said rib and including said rib is made said support point of said bending moment causing said rib to deform.

* * * * *